United States Patent [19]

Kato et al.

[11] Patent Number: 5,706,581
[45] Date of Patent: Jan. 13, 1998

[54] HIGH PRECISION MOUNTING METHOD FOR LINEAR GUIDE RAIL

[75] Inventors: Soichiro Kato; Hideyuki Tajimi, both of Gunma, Japan

[73] Assignee: NSK Ltd., Tokyo, Japan

[21] Appl. No.: 503,934

[22] Filed: Jul. 19, 1995

[30] Foreign Application Priority Data

Jul. 19, 1994 [JP] Japan ................... 6-166734

[51] Int. Cl.$^6$ .................................. B23Q 3/00
[52] U.S. Cl. ................... 29/898.07; 29/468; 29/271; 384/45
[58] Field of Search ................ 29/898.07, 898.09, 29/464, 468, 525.01, 271; 384/45

[56] References Cited

U.S. PATENT DOCUMENTS

| | | | |
|---|---|---|---|
| 4,118,101 | 10/1978 | Teramachi | 308/6 |
| 4,205,886 | 6/1980 | Teramachi | 308/6 C |
| 4,547,024 | 10/1985 | Teramachi | 384/45 |
| 4,555,840 | 12/1985 | Nakamura | 29/465 |
| 5,005,988 | 4/1991 | Lyon | 384/44 |
| 5,181,304 | 1/1993 | Piotrowski | 29/464 |
| 5,244,283 | 9/1993 | Morita | 384/45 |
| 5,358,338 | 10/1994 | Komiya | 384/45 |
| 5,393,144 | 2/1995 | Higuchi | 384/45 |

Primary Examiner—Irene Cuda
Assistant Examiner—Marc W. Butler
Attorney, Agent, or Firm—Sughrue, Mion, Zinn, Macpeak & Seas

[57] ABSTRACT

A high precision mounting method for linear guide rails is performed with the steps of: fixing the first linear guide rail to a first predetermined position while pressing the first linear guide rail against the reference surface of the mounting jig, disposing the mounting jig at a second predetermined position so that a section shape of the reference surface of the mounting jig in a longitudinal direction thereof is symmetric with respect to a center line between the first and second linear guide rails, and fixing the second linear guide rail to the mounting bed while pressing the second linear guide rail against the reference surface of the mounting jig disposed symmetrically. The mounting method is capable of mounting the linear guide rails in a short time.

3 Claims, 11 Drawing Sheets

HIGH PRECISION MOUNTING METHOD FOR LINEAR GUIDE RAIL

BACKGROUND OF THE INVENTION

The present invention relates to a high precision mounting method for linear guide rails used in a linear guide apparatus requiring a high precision, such as a semiconductor equipment, a small-size machine tool, a measuring equipment and the like.

As shown in FIG. 12, a linear guide apparatus LG includes a longitudinal linear guide rail 1 extending in the axial direction thereof and a slider 2 (which is also referred to as a bearing). The linear guide rail 1 includes one line or two lines of ball rolling grooves 3 on each of the side surfaces thereof. The slider 2 mounted movably on the linear guide rail 1 includes in the two sleeve portions thereof ball rolling grooves disposed in opposition to the above-mentioned ball rolling grooves 3 and ball circulating passages extending in parallel to the ball rolling grooves. In this structure, a plurality of balls, which roll within both the ball rolling grooves, are guided to the ball circulating passages to make an endless circulation, so that the slider 2 is guided by the linear guide rail 1 while moving linearly.

In the above-mentioned linear guide apparatus, generally, as shown in FIG. 11, two sets of linear guide rails 1A and 1B are fixed to a bed 5 of a machine unit in parallel to each other. A table 6 of the machine unit is mounted on the sliders 2 hanging over the linear guide rails 1A and 1B to operate the linear guiding motion.

The conventional method of mounting the linear guide rails 1 is mainly classified into two types.

The first conventional mounting method includes the steps of: forming a shoulder portion (step portion) 100 in parallel to the rail mounting surface 5a of the bed 5 to form a mounting reference surface; applying a mounting reference surface 1s of the linear guide rail 1 to the mounting reference surface of the bed, as shown in FIG. 12; and applying a lateral pressing plate 101 to the side surface opposed to the surface 1s for mounting the plate 101 along the mounting reference surface of the bed 5 by tightening a lateral pressing bolt 102 or by pushing the opposite surface side by hand.

In the second conventional mounting method, the bed 5 is such structured that the rail mounting surface 5a of the bed 5 remains to be flat with no shoulder portion serving as a mounting reference surface. As shown in FIG. 13, a straightedge 200 is disposed on the flat rail mounting surface 5a. With the straightedge 200 as a reference, the linear guide rail 1 is mounted along the straightedge 200 while measuring the distance between them by a measuring jig 201 such as a dial gauge or the like.

In either of the methods, after the linear guide rail 1 is placed on the rail mounting surface 5a of the bed 5 to be provisionally fixed at a predetermined mounting position, then rail mounting bolts respectively inserted through rail mounting bolt holes 1d are provisionally tightened. Next, after the linear guide rail 1 is accurately positioned according to either of the first and second mounting methods, the bolts are completely tightened to fix the linear guide rail 1 to the rail mounting surface of the bed 5.

The first conventional mounting method for the linear guide rails is advantageous in that it is easy to perform the mounting operation itself. However, since the shoulder portion 100 acting as the mounting reference surface on the side of the bed is formed integrally with the rail mounting surface 5a of the bed 5, the mounting precision (linearity) of the linear guide rail 1 inevitably depends on the precision of a machine tool used to machine the bed 5, so that it is difficult to mount the linear guide rail 1 with higher precision than the precision of the machined shoulder portion 100. In particular, when the shoulder portion 100 is formed by separately machining beds of a large number of machine units with high precision, the machining cost thereof is very high.

Further, in machining the shoulder portions 100 serving as the mounting reference surfaces on the side of the bed, if two parallel shoulder portions 100A and 100B are machined in one chucking work with a workpiece fixed to the chuck of a working machine, the linearity errors ε of the two shoulder portions 100A and 100B are found in the same direction on the right and left sides, as shown in FIGS. 14A and 14B. For this reason, the traveling precision of the machine table 6 (see FIG. 11), which hangs over the two linear guide rails 1A and 1B respectively mounted on the shoulder portions of the bed, is influenced directly by the same linearity errors ε of the two surfaces or shoulder portions 100A and 100B. As a result, there is a problem in which a yawing phenomenon is easy to occur in the machine table 6.

On the other hand, the second mounting method is advantageous in that the bed 5 can be machined easily because there is no need to form in the bed 5 the shoulder portion 100 acting as the mounting reference surface. However, since the linear guide rail 1 is mounted while measuring the distance of the linear guide rail 1 by the measuring jig 201 with the straightedge 200 used as a reference, there is a problem in which it takes a very long time to mount the linear guide rail 1 even if the high mounting precision (high linearity) can be obtained.

SUMMARY OF THE INVENTION

The present invention aims at eliminating problems found in conventional mounting methods for linear guide rails. Accordingly, an object of the present invention is to provide a high precision mounting method for linear guide rails in which it is capable of mounting the linear guide rails with high precision in a short time.

In attaining the above object, according to the present invention, a method of mounting two linear guide rails in two lines at predetermined positions on a mounting bed by a mounting jig with a reference surface is provided with the steps of: fixing the first linear guide rail to a first predetermined position while pressing the first linear guide rail against the reference surface of the mounting jig, disposing the mounting jig at a second predetermined position so that a section shape of the reference surface of the mounting jig in a longitudinal direction thereof is symmetric with respect to a center line between the first and second linear guide rails, and fixing the second linear guide rail to the mounting bed while pressing the second linear guide rail against the reference surface of the mounting jig disposed symmetrically.

Although the mounting reference surface of the mounting jig is machined with high precision, the reference surface has a shape error such as a surface undulation or the like as the linearity error in the longitudinal direction thereof. According to the present invention, the linear guide rails are pressed against the mounting reference surface of the mounting jig to be fixed onto the mounting bed. Due to this, the shape error of the reference surface is transferred to the linear guide rails, so that the fixed linear guide rails themselves have axial undulations corresponding to the axial shape error of the mounting reference surface.

Thus, if the mounting jig is reversed or turned upside down to dispose the mounting reference surface in the opposed manner, then the sectional shape (linearity error) of the surface undulation of the mounting reference surface in the longitudinal direction thereof is axially symmetric with respect to the center line between both the linear guide rails. Thus, if the other linear guide rail is mounted with the mounting reference surface of the mounting jig turned upside down, then the surface undulation of the mounting surface of the mounting jig is similarly transferred to the linear guide rails, so that the two mutually opposing linear guide rails in two lines have axially symmetric undulations (linearity errors) with respect to the center line between both the linear guide rails.

In a state which a table is hung over the sliders on the two lines of linear guide rails having such linearity errors which are axially symmetric with respect to the center line in such a manner that these elements are integrally connected to each other, the traveling precision of the table is evaluated. Although inside the respective sliders are produced internal forces due to displacement errors (yawing of sliders) during the traveling motion, the internal forces of the mutually opposing sliders act in the mutually opposite directions to repulse each other, so that the internal forces interfere with each other through the table connecting them to absorb the internal forces (which is hereinafter referred to as an interference effect). As a result of this, the traveling precision of the table itself can be maintained at high precision and thus the yawings of the sliders are hardly produced.

When the linearity error of the mounting reference surface of the mounting jig is formed in a substantially symmetric profile from the longitudinal central portion thereof toward both the ends of the mounting jig, instead of turning the mounting jig upside down to dispose it in an axial symmetric manner, the mounting jig can be rotated 180° horizontally to arrange both the ends of the mounting jig in a point symmetric relation.

DETAILED DESCRIPTION OF THE PREFERRED EMBODIMENTS

Preferred embodiments of the present invention will now be described with reference to the accompanying drawings.

Figure 1:
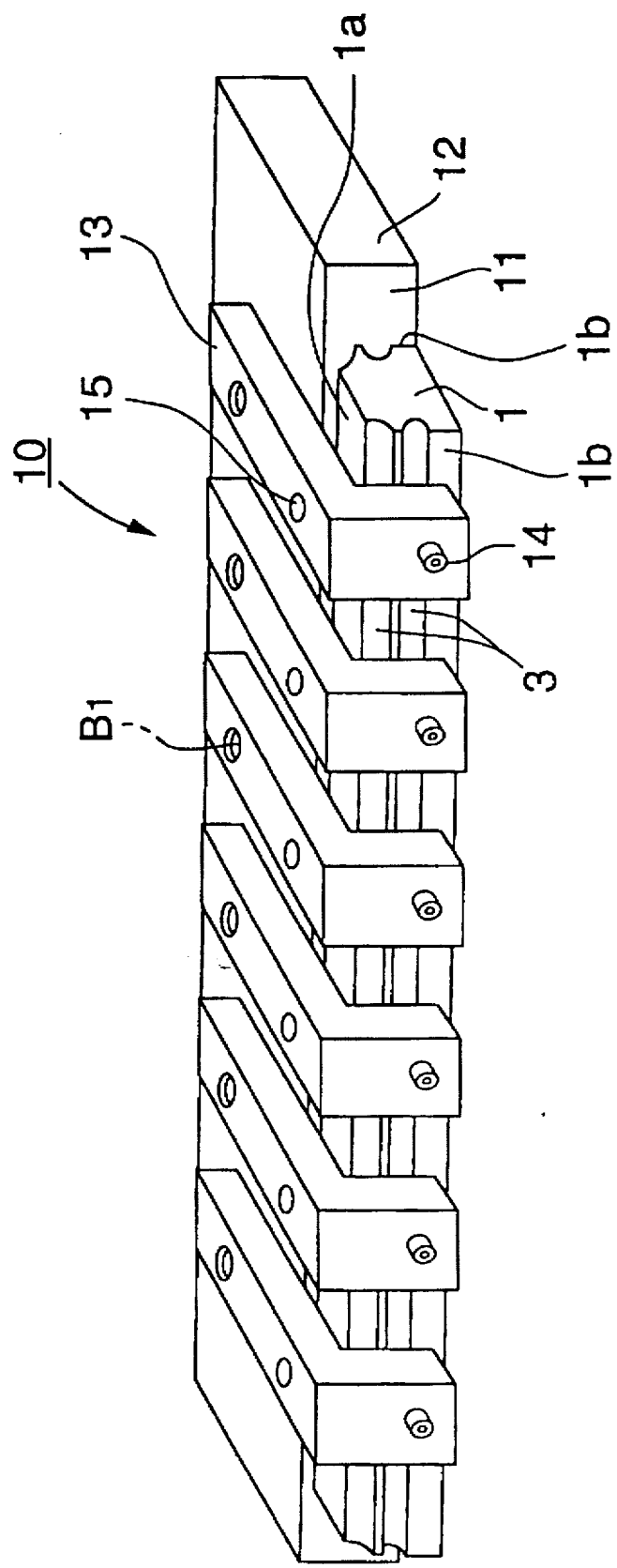
FIG. 1 is a perspective view showing a first embodiment of a mounting jig for linear guide rails.
Figure 2:
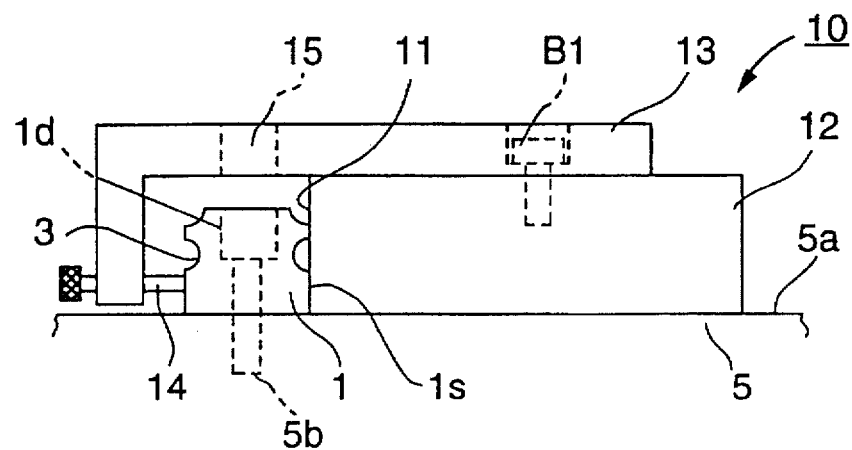
FIG. 2 is a front view showing the mounting jig shown in FIG. 1.

In a first embodiment, as shown in FIGS. 1 and 2, a rail mounting jig 10 includes a reference bar 12 formed in a planar shape having a larger section coefficient than a linear guide rail 1 and including a side surface formed as a mounting reference surface 11, and a plurality of L-shaped rail holding mechanisms 13 mounted on the reference bar 12. Each of the rail holding mechanisms 13 is removably fixed to the reference bar 12 by a bolt B1 having a hexagon hole, and a lateral pressing bolt 14 serving as a pressing device is threadingly mounted to the end side of each rail holding mechanism 13 opposed to the side surface 1b of the linear guide rail 1. Also, a bolt insertion hole 15 is formed in the portion of each rail holding mechanism 13 opposed to a rail mounting bolt hole 1d formed in the upper surface 1a of the linear guide rail 1.

Further, description will be given below of a method of mounting linear guide rails in two lines onto the rail mounting surface 5a of a bed 5.

Figure 3:
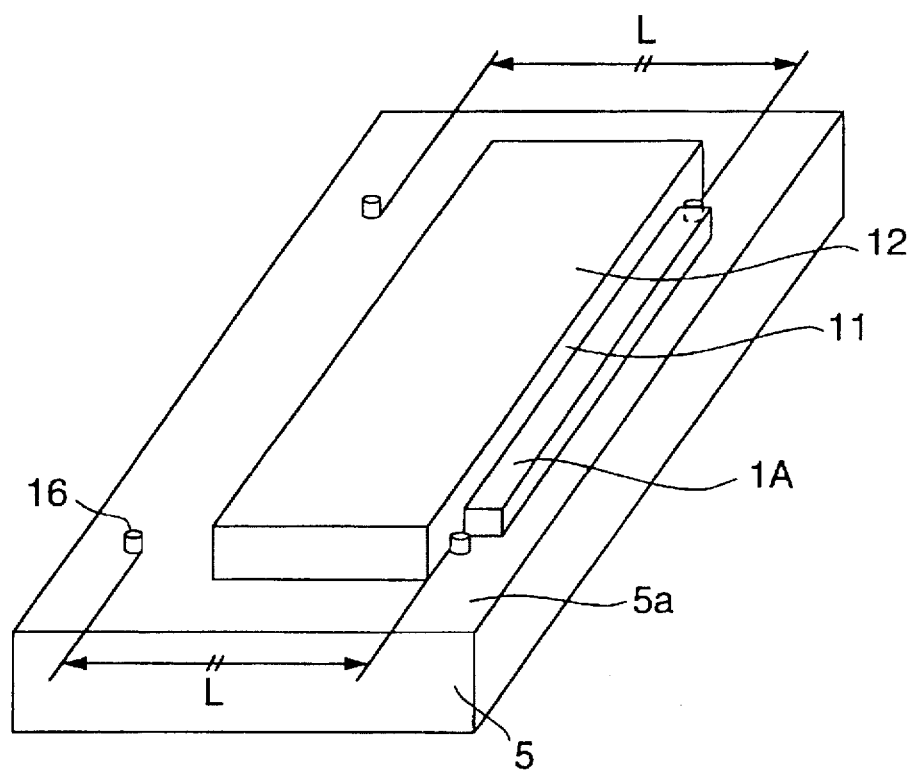
FIG. 3 is a perspective view showing the mounting jig shown in FIG. 1, showing a typical using state thereof.
Figure 4:
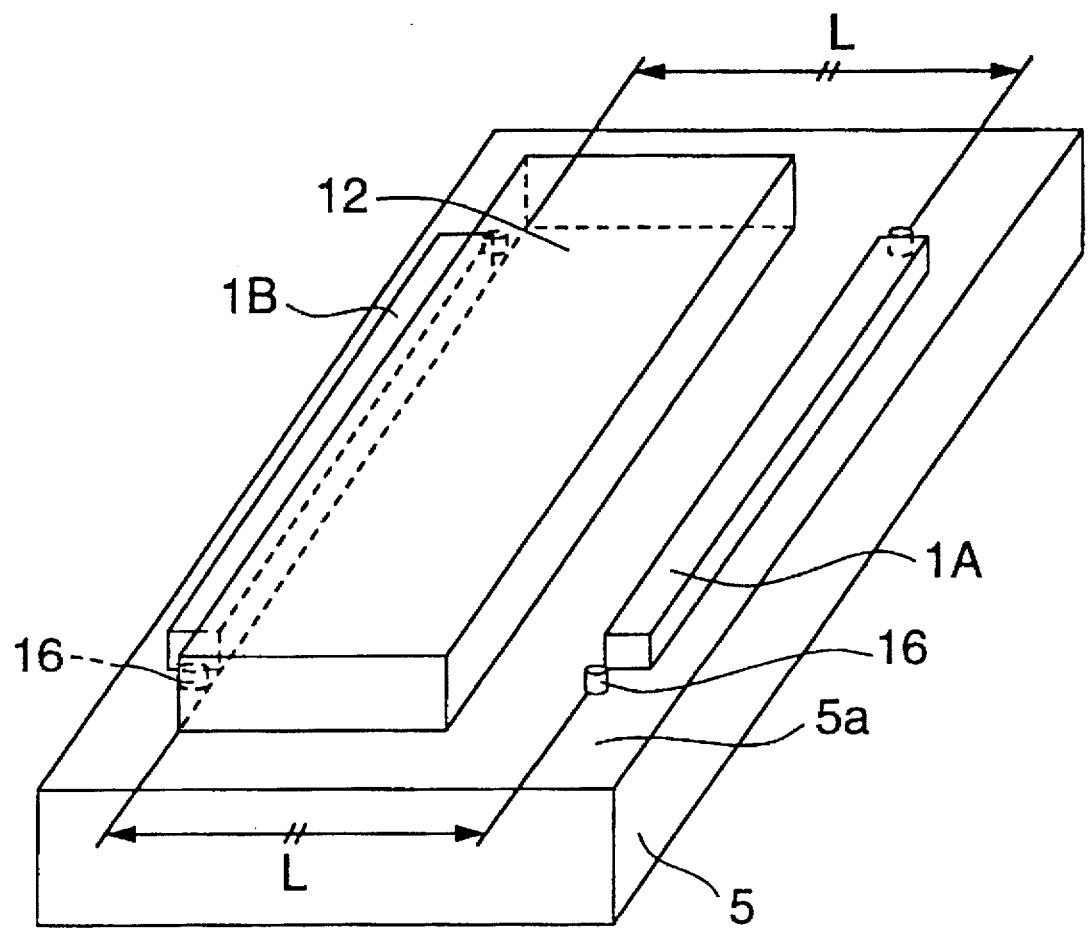
FIG. 4 is a perspective view showing the mounting jig shown in FIG. 1, in a typical using state.

The reference bar 12 is placed adjacent to the rail mounting position of the rail mounting surface 5a of the bed 5 with the mounting reference surface 11 facing the side surface 1b of one linear guide rail 1A. FIG. 3 is a perspective view of the rail mounting jig 10 in the above state (except for the rail holding mechanisms 13). Positioning pins 16 for supporting the reference bar 12 (or linear guide rail 1A) at two points thereof are previously projected on the rail mounting surface 5a, and the reference bar 12 (or linear guide rail 1A) is positioned by pressing it against the pins 16. Alternatively, instead of the positioning pins 16, shoulder portions can be formed on the rail mounting surface 5a. The positioning pins 16 or shoulder portions are disposed in the neighborhood of the two ends of the rail mounting surface 5a in the longitudinal direction thereof. As shown in FIG. 4, the positioning pins 16 or shoulder portions are used only to arrange two-line linear guide rails 1A and 1B in parallel to each other, while the linear guide rails 1A and 1B are disposed away from each other by a distance L.

The linear guide rail 1A is place along the mounting reference surface 11 of the thus positioned reference bar 12 and is positioned in such a manner that it is held between the mounting reference surface 11 and rail holding mechanisms 13 mounted on the reference bar 12 and acting as the pressing device.

Next, the lateral pressing bolts 14 of the rail holding mechanisms 13 are sequentially tightened to push one side surface of the linear guide rail 1A, so that the whole length of the opposite surface or mounting reference surface 1s of the linear guide rail is closely contacted with the mounting reference surface 11 of the reference bar 12 directly (or through a plate or the like). In this case, since the section coefficient of the reference bar 12 is sufficiently larger than that of the linear guide rail 1A, the deformation of the reference bar 12 can be controlled to a negligible extent.

Alternatively, before tightening the lateral pressing bolts 14, rail mounting bolts (not shown) are respectively mounted into the mounting bolt holes 1d formed in the linear guide rail by the bolt insertion holes 15 formed in the rail holding mechanisms 13. Previously, the rail mounting bolts can be tightened provisionally into rail mounting screw holes 5b formed at the predetermined positions of the rail mounting surface 5a of the bed 5 at regular pitches in the longitudinal direction thereof.

Thus, after the linear guide rail 1A is closely contacted with the mounting reference surface 11 of the reference bar 12 and is positioned accurately, the rail mounting bolts can be tightened completely to fix the linear guide rail 1A to the bed 5. That is, the rail mounting operation can be performed simply.

Next, the other linear guide rail 1B is set. In this case, the reference bar 12 of the rail mounting jig 10 used for mounting one linear guide rail 1A is turned upside down before it is used for the linear guide rail 1B. That is, the surface 12A, which is the upper surface when the linear guide rail 1A has been mounted, of the reference bar 12 is turned into a lower surface (a surface to be in contact with the rail mounting surface 5a of the bed 5). In this case, the rail holding mechanisms 13 fixed removably to the bolts B1 are removed from the surface 12A before the reference bar 12 is reversed. Further, the rail holding mechanisms 13 are removably fixed to the opposite surface 12B after the reference bar 12 is reversed.

The mounting reference surface 11 of the reference bar 12 originally has a shape error such as a surface undulation or the like in the longitudinal direction thereof. If the linear guide rail is pressed against the mounting reference surface 11 and is fixed onto the mounting bed 5, then the shape error of the mounting reference surface 11 of the reference bar 12 is transferred to the linear guide rail. As a result, the fixed linear guide rail itself has an undulation in the axial direction thereof.

Thus, after the mounting reference surface 11 of the reference bar 12 is used for guidance of the linear guide rail 1A, if the mounting reference surface 11 is reversed to be used for guidance of the other linear guide rail 1B, the section shape of the surface undulation of the mounting reference surface 11 is axially symmetric with respect to the center line between both the rails 1A and 1B. If the other linear guide rail 1B is mounted similarly by the mounting reference surface 11 of the reversed reference bar 12, then the surface undulation of the mounting reference surface 11 is similarly transferred to the linear guide rail 1B, so that the two linear guide rails 1A and 1B arranged in two lines opposed to each other, as shown in FIG. 5, has undulation (linearity error) axially symmetric with respect to the center line CL between the rails 1A and 1B.

Figure 5:
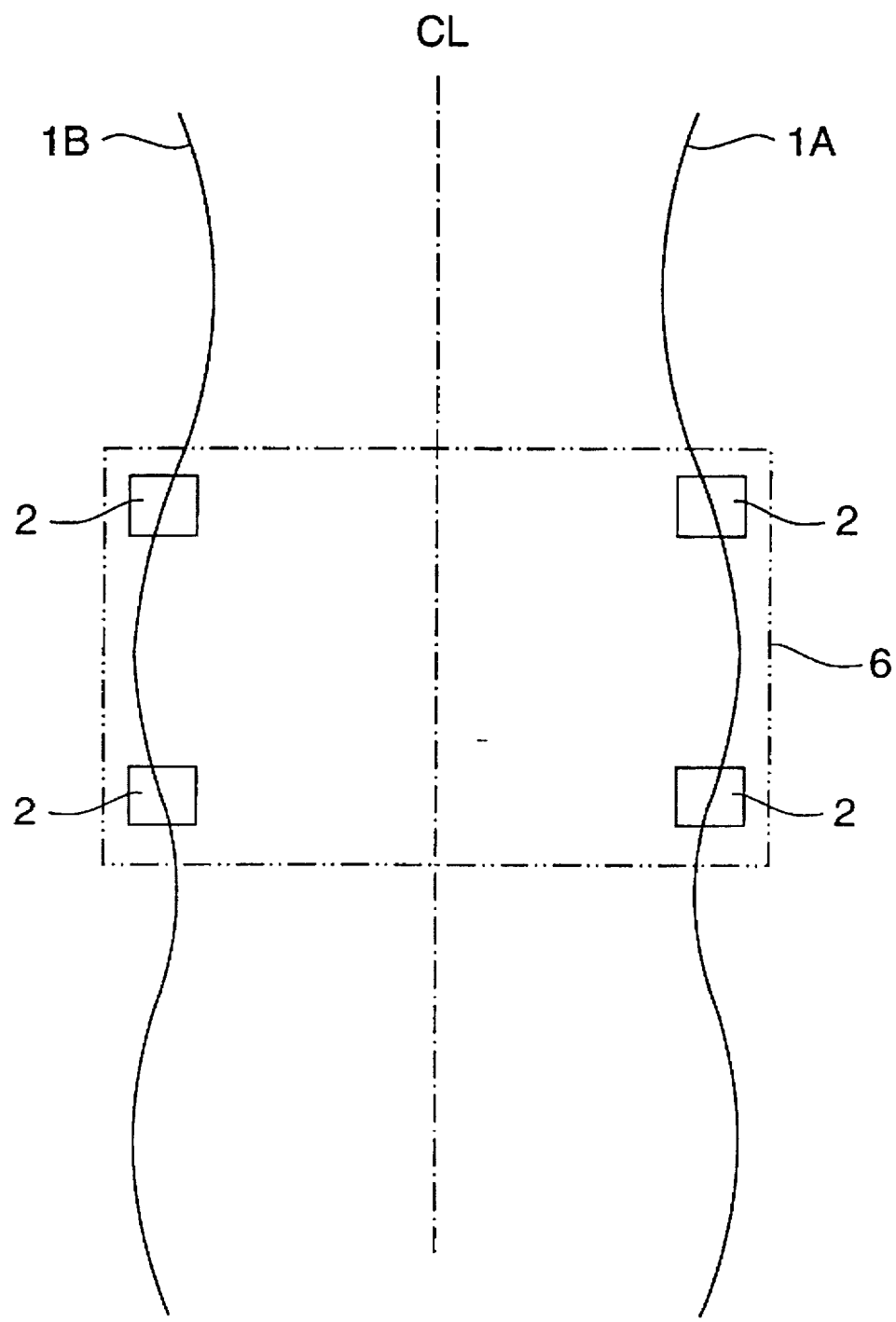
FIG. 5 is a typical view explaining the symmetry of the linearity errors of two lines of linear guide rails mounted according to a method of the present invention.

Now, the traveling precision of the table 6 is evaluated, as shown in FIG. 5, in such a manner that the table 6 is so placed as to hang over the two-line linear guide rails 1A and 1B through the sliders 2. Although there are produced within the sliders 2 internal forces due to the displacement errors (the yawings of the sliders) during the traveling of the table 6, the internal forces of the mutually opposing sliders 2 act in the opposite directions and repel each other, so that the internal forces interfere with each other and are thus absorbed through the table 6 connecting them together (which is hereinafter referred to as an interference effect). As a result of this, the traveling precision of the table 6 itself can be maintained at a high precision level and, actually, the yawings of the sliders are hardly produced.

Figure 6A:
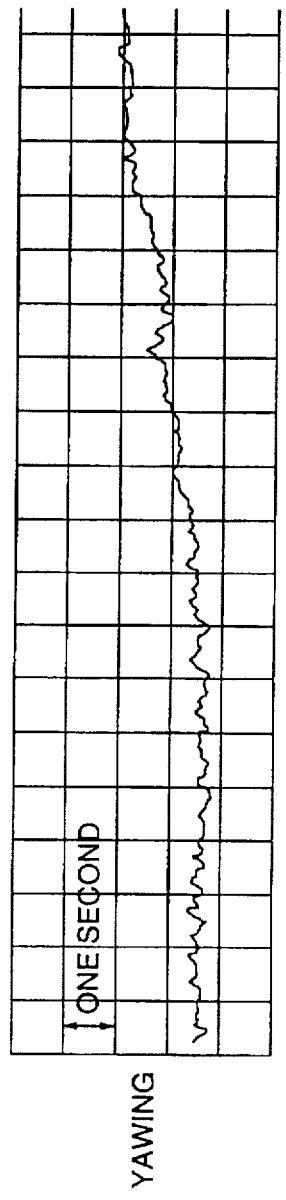
FIGS. 6A and 6B are graphs illustrating actually measured values of the mounting precision (by the yawing measurement) in two lines of linear guide rails mounted according to the method of the present invention.
Figure 6B:
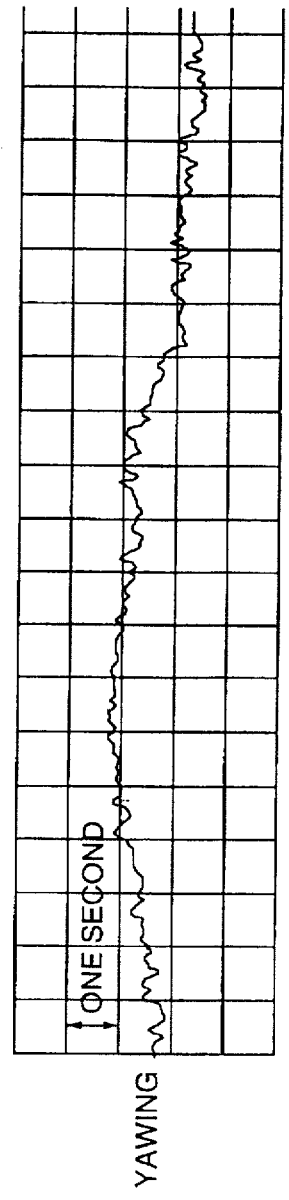
Figure 6C:
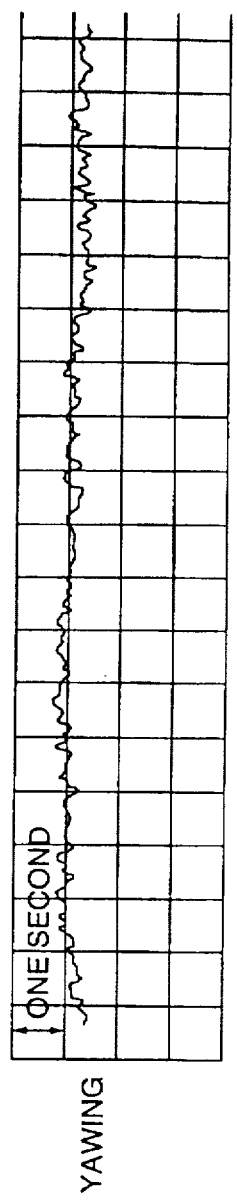
FIG. 6C is a graph illustrating measured values obtained when the linear guide rails are assembled in two lines.

FIGS. 6A, 6B and 6C show graphical representations of the values of the yawings of the sliders 2 (the right and left horizontal vibrations in the Y axis direction with respect to the traveling direction X axis) respectively traveling on the linear guide rails 1A and 1B mounted according to the present mounting method, and the values of the yawings of the table 6 supported by a total of four sliders provided two every rail, while the values are respectively measured by an automatic collimator. In this graph, the slider traveling stroke is 200 mm (the abscissa), and the ordinate shows the angles of the yawings.

The locus of the yawing on the side of the linear guide rail 1A in FIG. 6A is substantially axially symmetric to the locus of the yawings on the side of the linear guide rail 1B in FIG. 6B. On the other hand, few yawings can be recognized on the traveling locus of the table 6 in FIG. 6C.

Figure 7A:
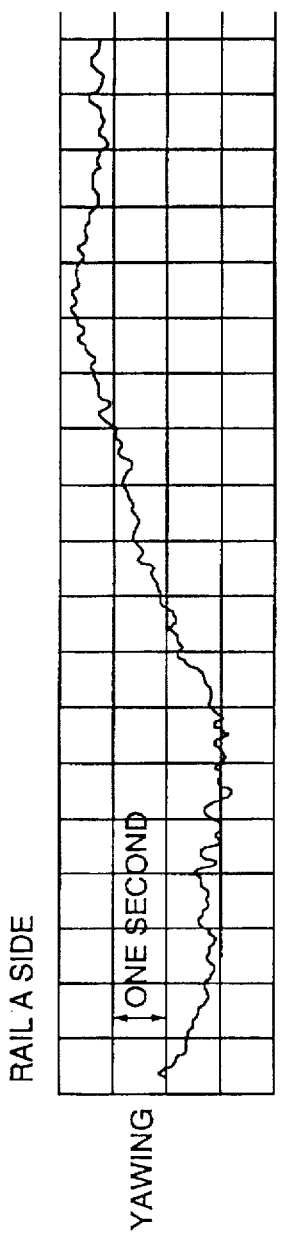
FIGS. 7A–7C are graphs illustrating actually measured values of the mounting precision (according to the yawing measurement) in two lines of linear guide rails mounted according to a conventional method.
Figure 7B:
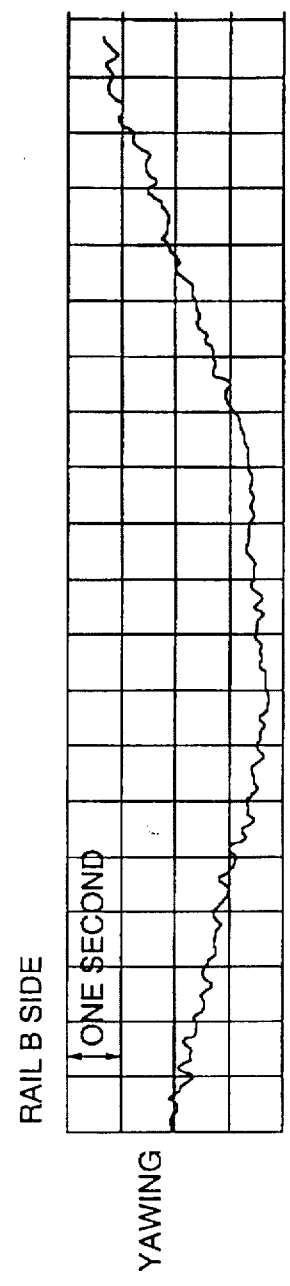
Figure 7C:
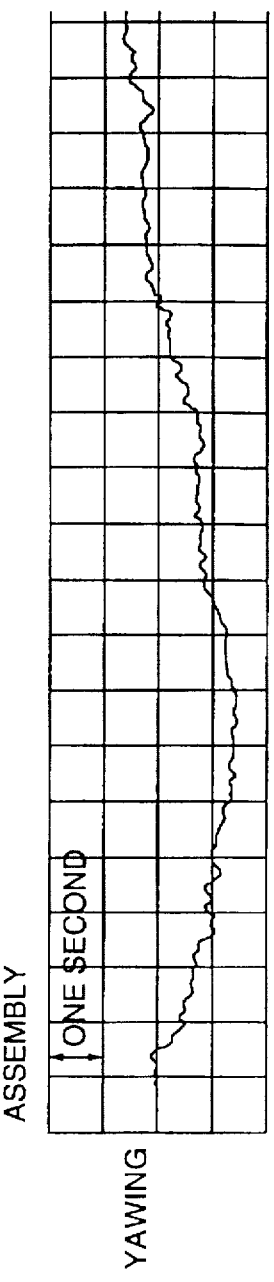
Figure 13:
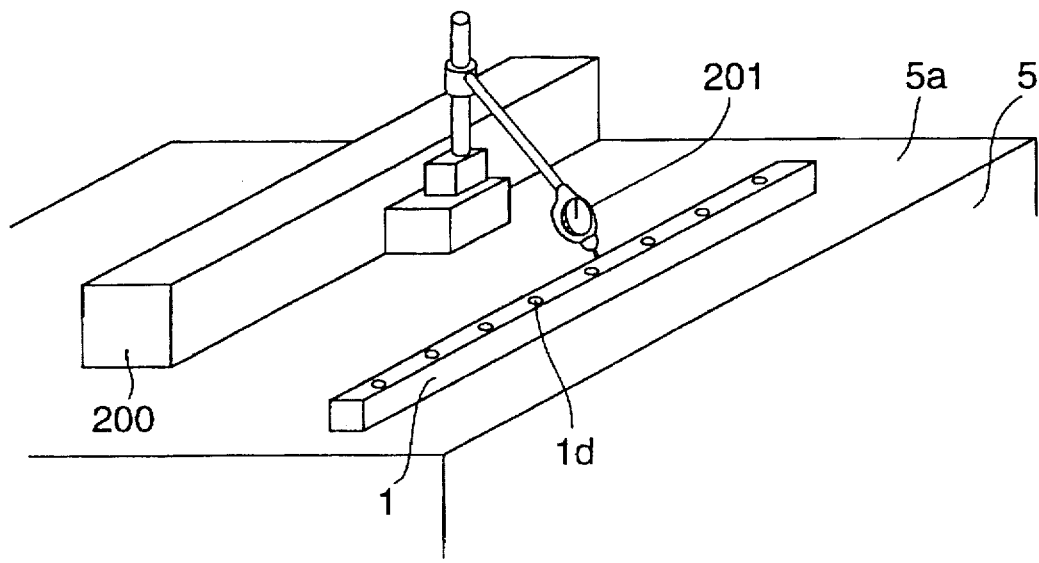
FIG. 13 is a front view showing a linear guide rail mounted on a mounting bed for explaining another conventional mounting method.
Figure 14A:
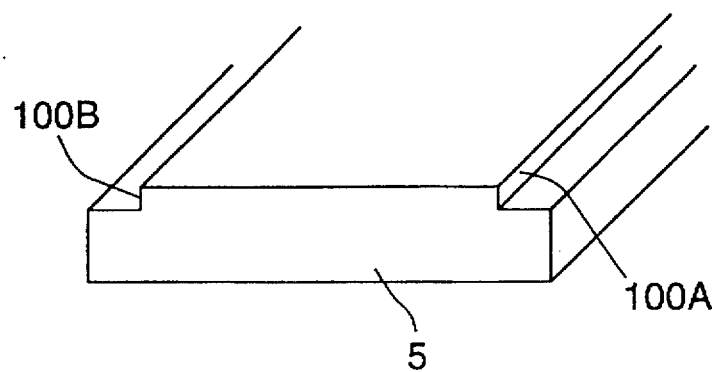
FIG. 14A is a partially perspective view of a mounting bed for explaining problems found in the conventional mounting methods and FIG. 14B is a typical view showing the shape error of the rail mounting portion of the mounting bed.
Figure 14:
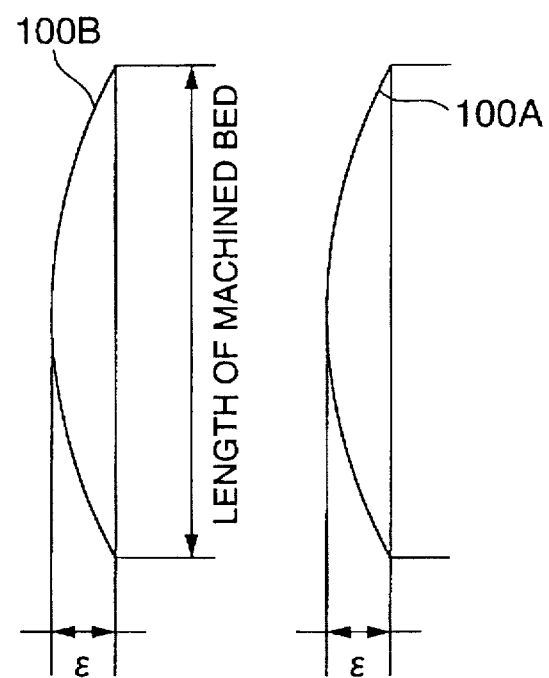

FIG. 7 shows the measured results of the yawings when the linear guide rails 1A and 1B according to the conventional dial gauge and straightedge methods (see FIG. 13), for comparison with the present invention. In the conventional methods, when the linear guide rails 1A and 1B are mounted, the shape correction of the rails is not made as in the present invention in which the rails are pressed against the reference surface of the straightedge. Therefore, the yawings of the respective sliders are larger than the present invention. Also, since the straightedge is not reversed, the loci of the yawings of the respective sliders due to the shape errors (mounting precision errors) of the two linear guide rails 1A and 1B in the axial direction thereof indicate the same trend but not symmetrical to each other. For this reason, the interference effect of the conventional methods is smaller than the present invention and a great yawing could be recognized on the table 6.

Figure 8:
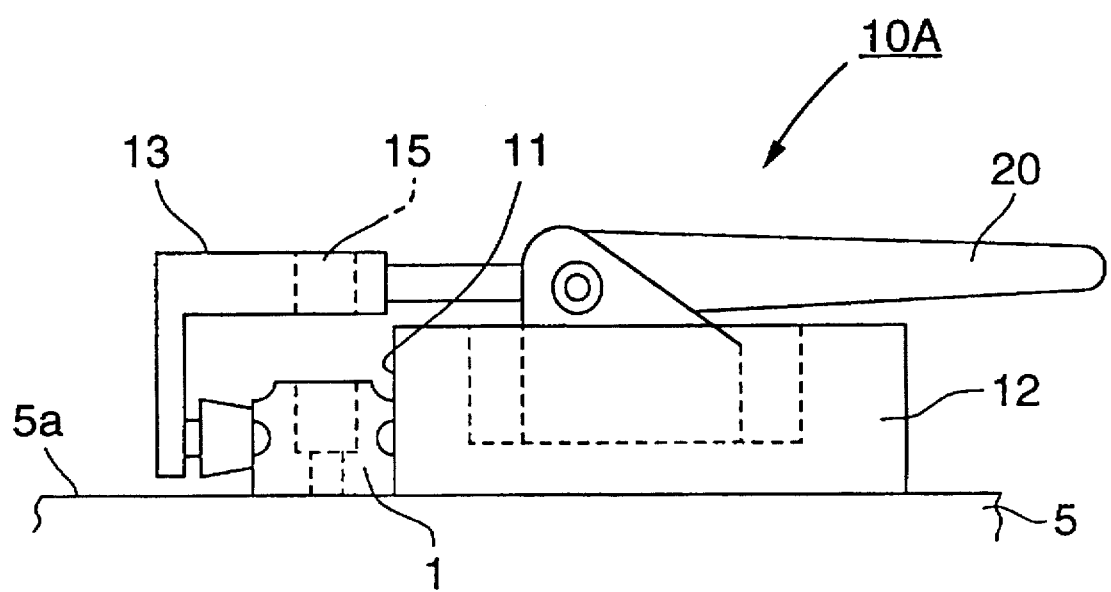
FIG. 8 is a front view showing a second embodiment of the mounting jig according to the present invention.

FIG. 8 is a front view of a second embodiment of a rail mounting jig used in a mounting method for linear guide rails according to the present invention.

In the rail mounting jig 10A according to the second embodiment, as the pressing device of the linear guide rail 1 provided in the rail holding mechanisms 13, instead of the lateral pressing bolts 14, there are used toggle clamps 20. The second embodiment is similar to the first embodiment in that the linear guide rails are mounted by the reversal of the reference bar 12. That is, the second embodiment is similar to the first embodiment in the mounting method, operation and effect.

Figure 9A:
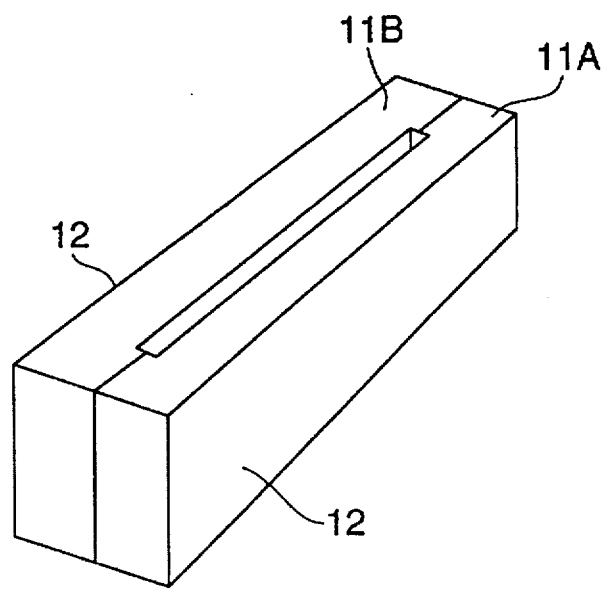
FIG. 9A is a perspective view showing a process to machine another mounting jig employed in the mounting method of the present invention.
Figure 9B:
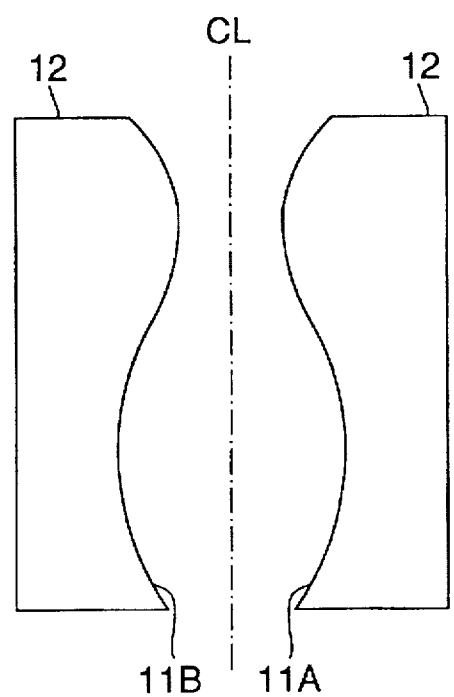
FIG. 9B is a plan view showing a typical using state of the mounting jig in FIG. 9A.

Alternatively, the two-line linear guide rails 1A and 1B can be mounted by using the reference surfaces of separate reference bars 12 as the guide for them. In this case, it is necessary that the shape errors of the mounting reference surfaces 11 of the different reference bars 12 are completely axially symmetric to each other. Accordingly, as shown in FIGS. 9A and 9B, while the bottom surfaces of the two reference bars 12 are contacted with each other and held by the same chuck, the respective mounting reference surfaces 11A and 11B are machined with high precision to provide the same error. That is, a rail mounting jig having the same shape error is used. The rail mounting jig including a pair of reference bars is used in such a manner that the reference bars are not reversed but the mounting references 11A and 11B are made to face each other or face in the opposite direction from each other. Due to this, the section shapes of the axial shape errors of the respective mounting reference surfaces 11A and 11B can be made axially symmetric to each other, so that there can be obtained a similar effect to the first embodiment and this effect can prevent the table 6 from yawing.

Figure 10:
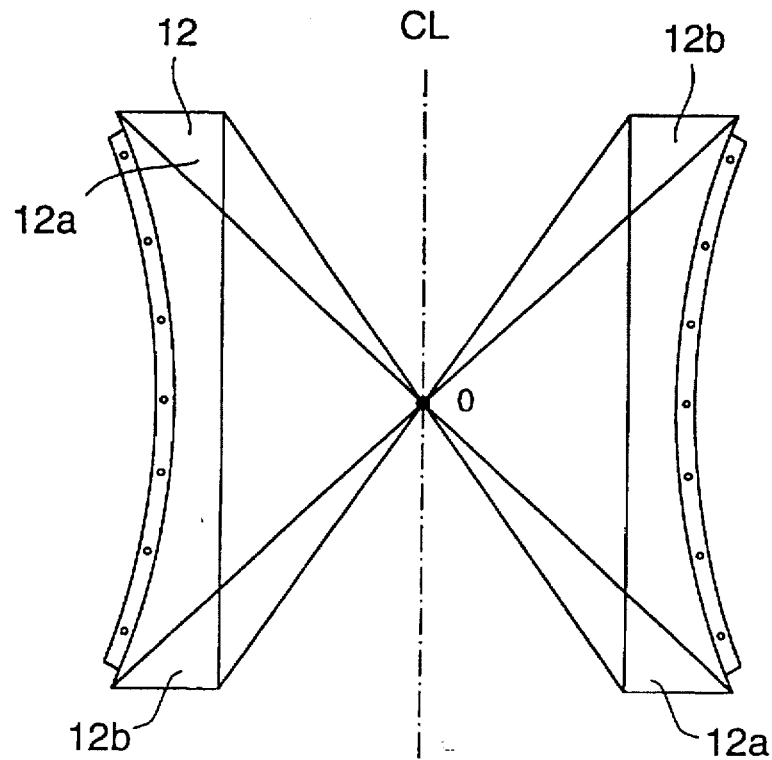
FIG. 10 is a plan view showing the mounting jig employed in the mounting method in another using state.
Figure 11:
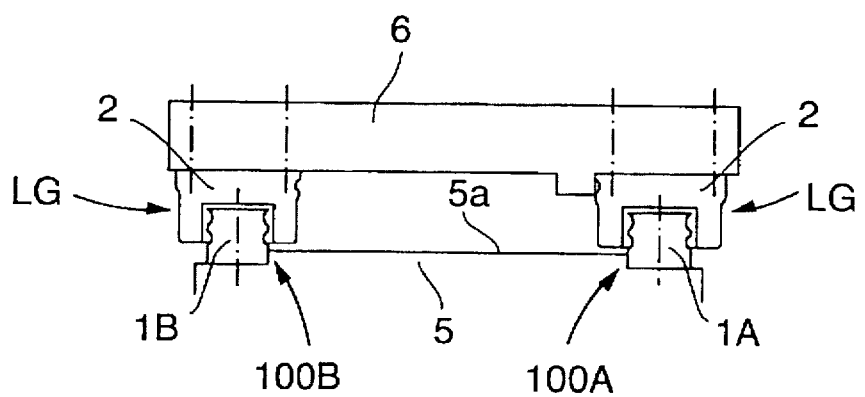
FIG. 11 is a front view showing two lines of the linear guide rails which are generally employed in a linear guide apparatus.
Figure 12:
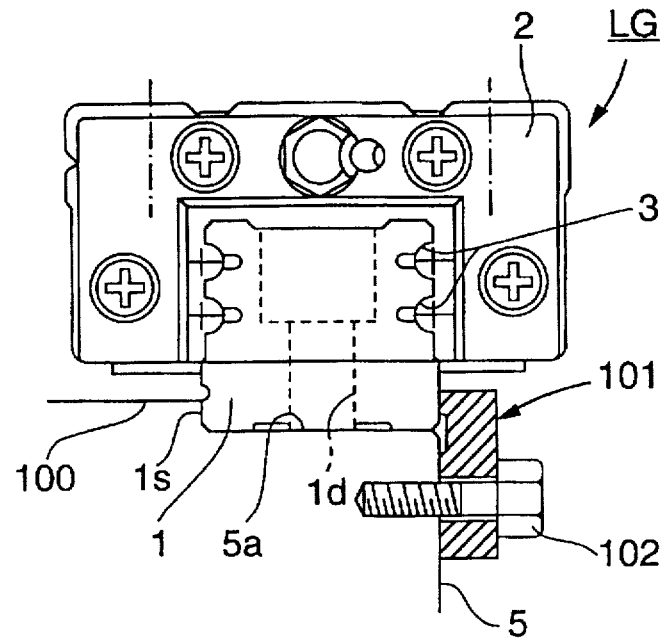
FIG. 12 is a front view showing a linear guide rail mounted on a mounting bed for explaining a conventional mounting method.

Also, when the shape error (linearity errors) of the mounting reference surface 11 of the reference bar 12 is formed in a substantially symmetric shape extending from the central portion thereof in the longitudinal direction, instead of the fact that the reference bar 12 is reversed to be thus arranged in an axially symmetric relation, the reference bar can be rotated at 180° in the horizontal direction. Accordingly, as shown in FIG. 10, the two end portions 12a and 12b of the reference bar 12 can be positioned in a point symmetric relation to each other with respect to a point 0 on the center line CL.

Further, the rail mounting jig employed in the present invention is not limited to the above-mentioned embodiments. For example, a plurality of rail holding mechanisms 13 can be unified together so that they may be removably formed on the reference bar 12 at the same time.

As described above, the mounting method according to the present invention includes the steps of: when mounting the linear guide rails in two lines at predetermined positions on the mounting bed, disposing a reference bar with one side surface thereof set as a mounting reference surface adjacent to a predetermined position, pressing one linear guide rail against the mounting reference surface of the reference bar and fixing the linear guide rail to the predetermined position; removing the reference bar from the linear guide rail and reversing the reference bar upside down or rotating it at 180° in the horizonal direction to dispose the reference bar at a position adjacent to the mounting position of the other linear guide rail; and pressing the other linear guide rail against the mounting reference surface of the reference bar and fixing it at the predetermined position. Due to this, the two linear guide rails arranged in two lines respectively have a symmetric shape error with respect to the center line. As a result of this, not only the traveling precision of the table hanging over the two-line linear guide rails through the sliders can be maintained at a high precision level, but also the linear guide rails can be mounted without measuring in detail each time. Therefore, compared with the conventional mounting methods, the linear guide rails can be mounted in a shorter time.

What is claimed is:

1. A mounting method of mounting parallel first and second linear guide rails on a mounting bed by a mounting jig with a reference surface, the method comprising the steps of:

(a) fixing the first linear guide rail to a first predetermined position while pressing the first linear guide rail against the reference surface of the mounting jig;

(b) disposing the mounting jig at a second predetermined position so that a section shape of the reference surface of the mounting jig in a longitudinal direction thereof is symmetric with respect to a center line between the first and second linear guide rails; and (c) fixing the second linear guide rail to the mounting bed while pressing the second linear guide rail against the reference surface of the mounting jig disposed symmetrically by the step (b).

2. The mounting method of claim 1, wherein in the step (b), the mounting jig is so turned along the center line that a surface of the mounting jig, which contacts the mounting bed in a first direction, faces toward a second direction opposing the first direction.

3. The mounting method of claim 1, wherein in the step (b), the mounting jig is so rotated in a horizontal direction on the mounting bed that the mounting jig is positioned in a point symmetric relation with respect to a central point on the center line.

* * * * *